United States Patent [19]

Smith, II et al.

[11] Patent Number: 5,611,653
[45] Date of Patent: Mar. 18, 1997

[54] SPINDLE HAVING LUBRICATION AND NUT RETENTION MEANS

[75] Inventors: Elwood B. Smith, II, Shawnee; Leonard R. Bailey, Seminole, both of Okla.

[73] Assignee: Al-Ko Kober Corporation, Shawnee, Okla.

[21] Appl. No.: 383,780

[22] Filed: Feb. 6, 1995

[51] Int. Cl.$^6$ ................................................. F16B 23/00
[52] U.S. Cl. ............................................ 411/395; 411/428
[58] Field of Search .................................. 384/389–391; 411/395, 381–382, 513–515, 945, 946, 428, 534

[56] References Cited

U.S. PATENT DOCUMENTS

| | | | |
|---|---|---|---|
| 121,176 | 11/1871 | Lamb . | |
| 352,942 | 11/1886 | Wood | 411/395 |
| 444,053 | 1/1891 | House | 411/945 |
| 829,039 | 8/1906 | Smith | 384/389 |
| 1,089,169 | 3/1914 | Weinschenker | 384/389 |
| 1,132,521 | 3/1915 | Jennings . | |
| 1,155,111 | 9/1915 | Twaits | 411/395 |
| 1,188,916 | 6/1916 | Dollman . | |
| 1,268,999 | 6/1918 | Ray | 411/395 |
| 1,390,609 | 9/1921 | France . | |
| 1,540,055 | 6/1925 | Chilton . | |
| 1,593,969 | 7/1926 | Fox | 384/391 |
| 1,852,319 | 4/1932 | Leighton . | |
| 1,854,048 | 4/1932 | Lauster | 411/946 |
| 1,931,386 | 10/1933 | Hughes | 50/26 |
| 2,279,681 | 4/1942 | Ilbery | 411/945 |
| 2,387,720 | 10/1945 | Davis | 85/47 |
| 3,845,568 | 11/1974 | Johnson et al. | 33/174 E |
| 4,072,448 | 2/1978 | Loyd, Jr. | 418/60 |
| 4,655,657 | 4/1987 | Duran | 411/946 |
| 4,806,064 | 2/1989 | Breese | 411/514 |
| 5,104,138 | 4/1992 | Allen | 280/433 |
| 5,120,170 | 6/1992 | Kalics | 411/213 |
| 5,299,676 | 4/1994 | Wade | 192/8 R |
| 5,372,434 | 12/1994 | Roberts et al. | 384/391 |

FOREIGN PATENT DOCUMENTS 1013820  12/1965  United Kingdom .................. 411/513

Primary Examiner—Steven N. Meyers
Assistant Examiner—Gary Estremsky
Attorney, Agent, or Firm—Head, Johnson & Kachigian

[57] ABSTRACT

A spindle having a threaded end and a lubricated area spaced from the threaded end, the spindle having a first lubricant passageway extending from the spindle end and terminating adjacent the lubricated area and a second lubricant passageway communicating with the first lubricating passageway and the lubricated area. The spindle further having a key opening adjacent the outer end, the key opening extending through the spindle longitudinal axis and the first lubricant passageway being spaced from the axis so that grease may be inserted through the first lubricant passageway without entering the key opening. In an alternate embodiment, the passageway and key openings intersect but the lubricant passageway is larger in diameter than the diameter of the key opening so that when a key is placed in the key opening, lubricant can flow on either side of the key as it flows through the first lubricating passageway, the key being dimensioned so that substantially no lubricant flows through the key opening.

8 Claims, 2 Drawing Sheets

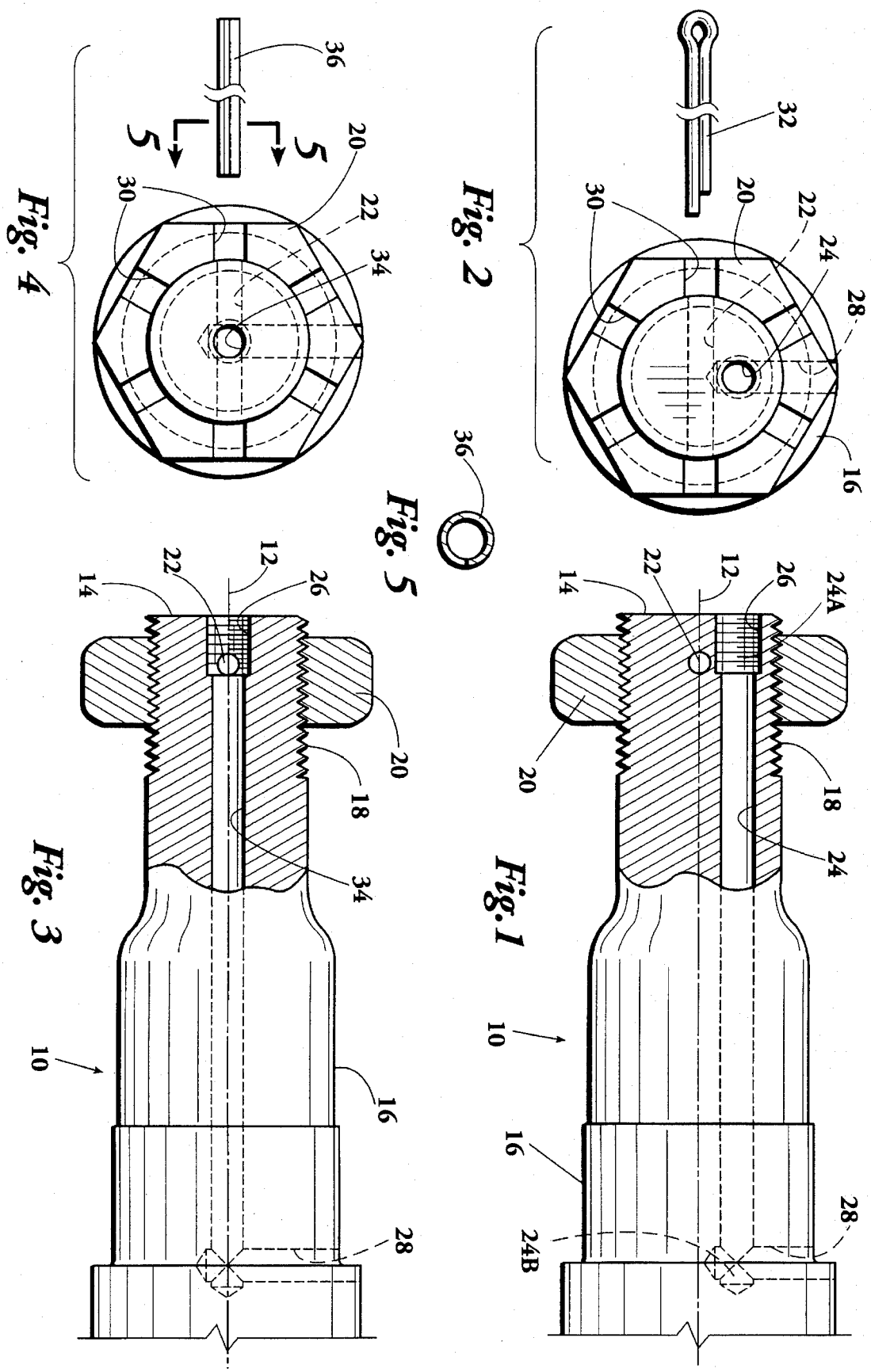

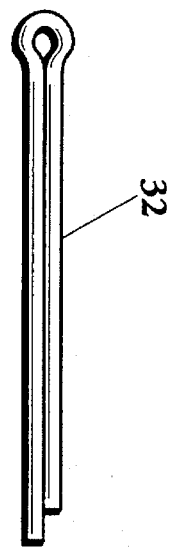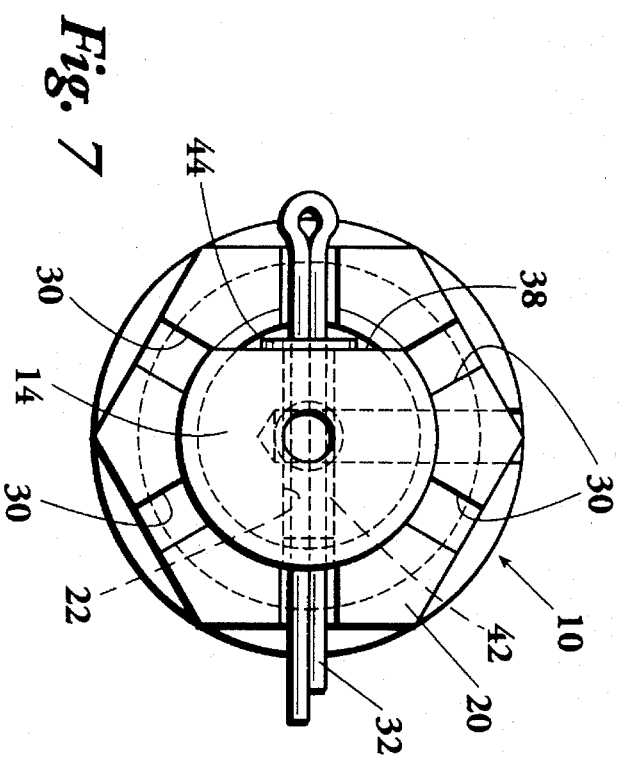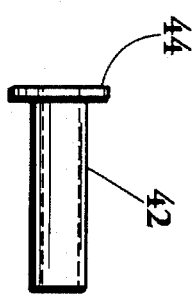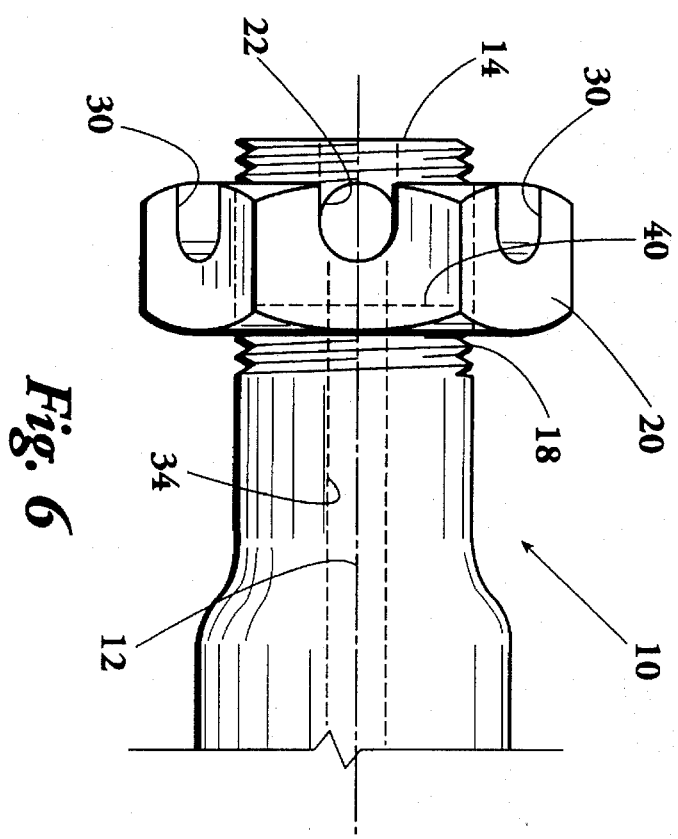

//5,611,653//

SPINDLE HAVING LUBRICATION AND NUT RETENTION MEANS

REFERENCE TO PENDING APPLICATIONS

This application is not related to any pending applications.

REFERENCE TO MICRO-FICHE APPENDIX

This application is not referenced in any micro-fiche appendix.

BACKGROUND OF THE INVENTION

Many machinery applications require lubrication to a bearing or bearing surface that is positioned on a spindle. One way to achieve this objective is to provide a lubricant passageway that is coincident with the spindle axis. By means of a grease zert or other grease receiving element that can be threaded or pressed into the end of the spindle, grease can be injected through the lubricant passageway, the lubricant traveling through the passageway until it encounters a second lubricant passageway which communicates, at one end, with the first lubricant passageway and, at that other end, with a lubricated area on the spindle. This system works well except it introduces a problem, that is, the problem of keying a nut threaded onto the spindle at the outer end. That is, it is very common to employ a pin or cotter key to extend through the spindle in the threaded area so that a nut positioned on the spindle can be held in position. The problem then arises as to the interference between the first lubricant passageway and the key opening. Since these openings intersect, grease injected into the passageway can pass out of the key opening. In addition, a key, when inserted in the key opening, interferes with the passage of grease along the first lubricant passageway.

One way to overcome this problem is illustrated in U.S. Pat. No. 5,120,170 entitled "Apparatus For Retaining A Nut On A Spindle". In this patent the first lubricant passageway is coaxial with the spindle axis. However, to avoid the intersection of the key opening with the lubricant passageway, the key opening is offset from the center of the spindle. That is, the key opening is drilled along a chord midway between the lubricant passageway and the peripheral exterior of the spindle threaded portion. A pin, such as a cotter key, can then be inserted in the key opening to pass through openings or slots in a nut to lock the nut onto the spindle.

A problem with the system of U.S. Pat. No. 5,120,170 is that the placement of the key opening on a chord of the spindle makes it difficult to align a pin with openings or slots in a nut. In U.S. Pat. No. 5,120,170 the nut illustrated is termed a "castellated nut", that is, a nut that has several circumferentially spaced slots. A cotter pin extending through a key opening that is a chord of the spindle end requires wide slots in the nut.

Further, it is difficult to drill a cordial hole through a spindle. A special fixture is usually required to prevent the hole being drilled from wondering and to prevent drill bit breakage.

The present invention intends to address the problems encountered with U.S. Pat. No. 5,120,170 by providing a spindle having a lubrication passageway that communicates with the end of the spindle and also has a key opening, but wherein the key opening is in the center of the spindle, that is, it passes through the axis of the spindle to engage slots or holes in a nut so that the slots or holes are not required to be any larger in width or diameter than the diameter of the key opening or the diameter of the key being used to retain the nut.

SUMMARY OF THE INVENTION

This invention provides a spindle having means for conveying lubrication to a lubricated area and for retaining a nut. The spindle has an axis, an outer end and a lubricated area. The lubricated area is concentric with the spindle axis and is spaced away from the spindle outer end. A threaded area is formed on the spindle at the outer end.

A first lubricant passageway is formed in the spindle. In one embodiment of the invention the first lubricant passageway is paralleled to and spaced from the spindle axis. A first end of the first lubricant passageway communicates with the spindle outer end where it may receive a device by which lubrication is applied, such as a grease zert. The spindle passageway has a second end that terminates adjacent the spindle lubricated area.

A second lubricant passageway is formed in the spindle and communicates between the first lubricant passageway and the spindle lubricated area.

A key opening is provided through the spindle in the threaded area, the key opening being adjacent to but spaced from the outer end. The key opening is in a plane of the spindle axis, that is, the key opening passes through the spindle axis. Since, in the first embodiment, the first lubricant passageway is spaced away from the spindle axis, the key opening does not intersect the lubricant passageway. The key opening can receive a key, such as a cotter pin, by which a nut is retained on the spindle without the possibility of lubricant escaping through the key opening. Openings or slots in the nut that receives a key, such as a cotter pin, do not need to be of greater diameter or width than the key itself.

In another embodiment of the invention, the first lubricant passageway is concentric with the spindle axis. The key opening passes through the spindle axis. The diameter of the first lubricant passageway is greater than the diameter of the key opening. To retain a nut on the spindle, a key is employed that has a circumferential surface that substantially conforms to the key opening, that is, a key is selected that has a diameter to snugly fit in the key opening so that when lubricant is forced into the first lubricant passageway, the lubricant can flow around the key that is positioned in the key opening but the tight fit of the key in the key opening prevents lubricant from escaping out of the key opening. A key that fulfills this requirement can be formed as a roll pin.

In another embodiment a tubular nut retainer is positioned in the key opening, the diameter of the tubular nut retainer being selected to snugly fit in the key opening. Lubricant can flow through the first lubricant passageway that is larger in diameter than the key opening and to either side of the tubular sleeve, however, grease cannot escape along the key opening since the tubular sleeve completely fills the key opening. To retain a nut on the spindle a cotter key is inserted through the tubular sleeve to engage holes or slots in the nut to thereby prevent the nut from inadvertently being unthreaded from the spindle.

A better understanding of the invention will be obtained from the following description of the preferred embodiments taken in conjunction with the attached drawings.

DESCRIPTION OF THE DRAWINGS

FIG. 1 is an elevational partial cross-sectional view of a portion of a spindle, the spindle having a lubricated area and threads at the outer end that receive a nut. The spindle has a passageway for conducting lubrication from the end of the spindle to the lubricated area and for receiving a key, such as a cotter pin, for retaining a nut in position.

FIG. 2 is an end view of the arrangement of FIG. 1 showing a cotter pin as used to retain the nut on the spindle. The key opening that receives the cotter pin and the first lubricant passageway are positioned in such a way that no possibility for lubricant passing out the key passageway can occur.

FIG. 3 is an elevational, partial cross-sectional view, of a spindle as shown in FIG. 1 but showing an alternate embodiment where the first lubricant passageway is concentric with the spindle axis.

FIG. 4 is an end view of the embodiment of FIG. 3 wherein the key opening intersects the first lubricant passageway and wherein a key is employed having a diameter to snugly fit in the key opening so that leakage of lubricant out the key opening is prevented.

FIG. 5 is a cross-sectional view of the key as shown in FIG. 4 showing the use of a roll pin as the key to retain a nut in position.

FIG. 6 is an elevational view of the end portion of the spindle of the type as illustrated in FIGS. 2 and 3 and illustrating a third embodiment of the invention.

FIG. 7 is an elevational end view of the spindle of FIG. 6 showing a cotter pin that is received in a tubular nut retainer positioned in a key opening by which a nut is held in position on the spindle.

FIG. 8 is a cross-sectional view of a tubular rivet of the type that can be employed in the embodiment of FIGS. 6 and 7.

FIG. 9 is a elevational view of a cotter pin that can be employed in conjunction with the tubular rivet in the embodiment of FIGS. 6 and 7.

DETAILED DESCRIPTION OF THE PREFERRED EMBODIMENTS

Referring to FIGS. 1 and 2, a first embodiment of the invention providing a spindle having lubrication and nut retention means is shown. A spindle is generally indicated by numeral 10, a spindle having an axis 12. The spindle has an outer end 14 and, spaced from the outer end 14, a lubricated area 16. By "lubricated area" means an area wherein lubrication is required. Lubricated area 16 may be in the form of a cylindrical surface on which a rotational object, such as a wheel or gear, is received or the lubricated area 16 may be an area that receives a bearing (not shown) that receives lubrication.

Spindle 10 further has a threaded area 18 at the outer end 14. A nut 20 is received on threaded area 18 to hold an object, such as a wheel, gear or so forth on the spindle.

In order to retain nut 20 in position on the spindle, that is, to prevent the nut from unintentionally unthreading, it is a common practice to use a key, such as a cotter pin. For this purpose, it is a common expedient to have a key opening 22 in the spindle. For convenience of use and to permit the use of commonly available nuts having radial openings or slots, the key opening 22 must pass through the rotational axis 12.

In order to provide lubrication to the lubricated area 16, a first lubricant passageway 24 is drilled in the spindle. First lubricant passageway 24 is parallel to and spaced from rotational axis 12. One end 24A of first lubricant passageway 24 communicates with spindle end 14 and is provided with threads 26 to threadably receive a zert fitting (not shown) or other item by which lubricant can be injected into first lubricant passageway 24. Rather than using threads 26, a grease zert can be driven into the first lubricant passageway 24. The other end 24B of first lubricant passageway 24 terminates adjacent lubrication area 16.

A second lubricant passageway 28 communicates between first lubricant passageway 24 and the lubricated area 16.

FIG. 2 is an end view showing nut 20 which, as illustrated in end view, is a castellated nut having spaced apart slots 30 that can be aligned with key opening 22. When the nut is arranged with slots 30 in alignment with key opening 22, a key, such as a cotter pin 32, can be inserted through slot 30 and key opening 22 so as to rotationally lock the nut to the spindle.

In the embodiment of FIGS. 1 and 2 since there is no communication between key opening 22 and first lubricant passageway 24. Therefore, there is no possibility of lubricant escaping from the passageway out through the key opening. It can be seen that the spindle configuration of FIGS. 1 and 2 permit the use of standard castellated nuts since a key or pin, such as a cotter key, used to lock the nut to the spindle extends radially through the spindle, and therefore through the nut axis.

FIG. 3 shows an alternate embodiment of the invention. Spindle 10, axis 12, outer end 14, lubricated area 16, threaded area 18, nut 20, and key opening 22 are all the same as described with reference to FIGS. 1 and 2. First, lubricant passageway 34 is drilled in the spindle co-axially with rotational axis 12. Lubricant passageway 28 functions the same as previously described. In the embodiment of FIGS. 3 and 4, the key passageway 22 intersects the first lubricant passageway 34. Since there is an intersection between the key passageway 22 and first lubricant passageway 34, lubricant inserted into passageway 34 will tend to escape through the key passageway 22. Further, a key positioned in key passageway 22 could block the flow of lubricant through the lubricant passageway 34. These two problems are overcome in the present invention by first, making the lubricant passageway 34 of larger diameter than key passageway 22 at least in the area thereof where first lubricant passageway 34 is intersected by key opening 22. Second, a pin 36 is employed having a circumferential external surface that snugly fits in key opening 22. A pin 36 meeting this requirement may be such as a roll pin having a cross-sectional shape as shown in FIG. 5. Roll pins are commonly employed in industry. They have the characteristic that when driven or pressed into a key passageway the circumferential diameter is compressed. This is due to the fact that in its normal unused state, a roll pin has a slight gap between its longitudinal edges so that when the edges are forced together the roll pin tends to constantly exert an outwardly expanding tension. Therefore, when roll pin 36 is driven into key opening 22 it resists extraction. Roll pin 36 is employed as a key in this application since its normal circumferential exterior surface, when in a compressed condition, closes key opening 22 to prevent lubricant from flowing out through the key opening when lubricant is being forced into first lubricant passageway 34.

As seen in FIG. 4, when pin 36, in the preferred form as a roll pin, is driven into key opening 22, as the pin extends between slots 30 in nut 20, nut 20 is rotatably locked to the spindle and at the same time, roll pin 36 is secured into position in a way to seal key opening 22 against the escape of lubricant.

FIGS. 6 and 7 show another alternate embodiment of the invention wherein spindle 10 having axis 12, an outer end 14, a threaded area 18, a nut 20, and a key opening 22 are illustrated all as described with reference to FIGS. 1 and 3. It is understood that the spindle 10 of FIG. 6 has a lubricated area and a second lubrication passageway as described with reference to FIGS. 1 and 3 that are not illustrated. In the embodiment of FIGS. 6 and 7, the first lubricant passageway 34 is co-axial with spindle longitudinal axis 12 and is of a diameter greater than the diameter of key opening 22 which intersects first lubricant passageway 34, all as described with reference to FIGS. 3 and 4. However, in FIGS. 6 and 7, a flat surface 38, as seen in FIG. 7, is formed at the end 14 of spindle 10, the length of the flat surface being indicated by the dotted line 40 in FIG. 6. Flat surface 38 is in a plane parallel a plane of longitudinal axis 12.

Received within key opening 22 is a tubular rivet 42. Tubular rivet 42 has a head 44 that fits against spindle flat surface 38. The diameter of tubular rivet 42 is substantially that of key opening 22 so that the tubular rivet fits snugly within the key opening. In this way, when grease is inserted into first lubricant passageway 34, the lubricant can flow around the tubular rivet 42 but does not escape along the key opening 22.

In order to retain nut 20 in position on the threaded area 18 of spindle 10, cotter key 32 can be positioned in tubular rivet 42 to extend through slots 30 in nut 20. A cotter key like that of 32 is usually flat in cross-sectional configuration and would not seal key opening 22, however, by the use of tubular rivet 42, the key opening is sealed and a cotter key can then be employed in the usual way to rotatably lock nut 20 on threaded area 18 of the spindle.

FIGS. 6 and 7 show a preferred embodiment employing a tubular rivet. An alternate possibility is to use a tubular member 42, without a head, (not illustrated) of a length slightly less than the diameter of the threaded area 18 of the spindle. Such tubular member can be positioned in key opening 22 without requiring a flat surface 38 to function in the same way as the tubular rivet as shown in FIG. 8.

Each of the embodiments shown and described herein provide a new and unique way of lubricating a bearing area by employment of a lubricant passageway extending either coincident with or parallel the rotational axis of a spindle while, at the same time, providing means for locking a nut on the spindle in a way that the locking arrangement will not permit the escape of lubricant along a key opening.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A spindle system providing lubrication to a lubricated area and for retaining a nut comprising:

a spindle having an axis, an outer end, an area having lubrication spaced from said outer end and having a threaded area adjacent said outer end, the lubricated area being configured to receive a bearing thereon;

a first lubricant passageway formed in the spindle, the first passageway being at least substantially co-axial with said spindle axis, a first end of the first lubricant passageway communicating with said spindle outer end and adaptable to receive a grease fitting therein and a second end terminating adjacent said spindle lubricated area;

a second lubricant passageway formed in said spindle intersecting at an angle said first lubricant passageway and communicating said first lubricant passageway with said spindle lubricated area;

a key opening through said spindle adjacent to but spaced from said outer end, the key opening radially intersecting said spindle axis and said first lubricant passageway, said first lubricant passageway being of greater diameter than said key opening; and a nut retainer received in said key opening functionable to retain a nut on said spindle threaded portion, the diameter of the nut retainer being substantially equal to said key opening whereby the nut retainer fits snugly in said key opening whereby grease may be inserted into said first lubricant passageway at said spindle outer end to flow past said nut retainer in said key opening as the lubricant flows to said second lubricant passageway, said nut retainer at least substantially preventing the flow of lubricant through said key opening.

2. A spindle system according to claim 1 wherein said nut retainer is in the form of a roll pin.

3. A spindle system according to claim 1 wherein said nut retainer includes:

a tubular sleeve received in said key opening of a diameter substantially equal to said key opening whereby the tubular sleeve fits snugly in said key opening to at least substantially prevent the flow of lubricant through said key opening; and a key member received in said tubular sleeve.

4. A spindle system according to claim 3 wherein said key member is a cotter key.

5. A spindle system according to claim 3 wherein said spindle has a machined surface at said outer end in said threaded area, and wherein said key member is in the form of a tubular rivet.

6. A spindle system having means for providing lubrication to a lubricated area and for retaining a nut comprising:

a spindle having an axis, an outer end, an area having lubrication spaced from said outer end adaptable to receive a bearing thereon and a threaded area adjacent said outer end;

a first lubricant passageway formed in the spindle, the first passageway being at least substantially co-axial with said spindle axis, a first end of the first lubricant passageway communicating with said spindle outer end and adaptable to receive a grease fitting therein and a second end terminating adjacent said spindle lubricated area;

a second lubricant passageway formed in said spindle intersecting said first lubricant passageway and providing communication between said first lubricant passageway and said spindle lubricated area;

a key opening through said spindle adjacent to but spaced from said outer end, the key opening radially intersecting said spindle axis and said first lubricant passageway, said first lubricant passageway being of greater diameter than said key opening; and a tubular sleeve received in said key opening of a diameter substantially equal to said key opening whereby grease may be inserted into said first lubricant passageway at said spindle outer end to flow past said tubular sleeve in said key opening as the lubricant flows to said second lubricant passageway, and whereby the tubular sleeve fits snugly in said key opening to at least substantially prevent the flow of lubricant through said key opening; and a key member received in said tubular sleeve.

7. A spindle system according to claim 6 wherein said key member is a cotter key.

8. A spindle system according to claim 6 wherein said spindle has a machined surface at said outer end in said threaded area, and wherein said key member is in the form of a tubular rivet.

* * * * *